No. 748,595. Patented January 5, 1904.

UNITED STATES PATENT OFFICE.

NEAL FARNHAM, OF CHICAGO, ILLINOIS.

METHOD OF WATERPROOFING AND FINISHING THE SURFACE OF STONE, BRICK, OR OTHER ANALOGOUS POROUS MATERIAL.

SPECIFICATION forming part of Letters Patent No. 748,595, dated January 5, 1904.

Application filed February 18, 1903. Serial No. 144,000. (No specimens.)

*To all whom it may concern:*

Be it known that I, NEAL FARNHAM, a citizen of the United States, residing at Chicago, in the county of Cook and State of Illinois, have invented certain new and useful Improvements in Methods of Waterproofing and Finishing the Surface of Stone, Brick, or other Analogous Porous Materials; and I do declare the following to be a full, clear, and exact description of the invention, such as will enable others skilled in the art to which it appertains to make and use the same.

My invention relates to waterproofing surfaces of brick, stone, or other analogous porous material; and it has for its object to waterproof the material and leave its surface with practically the natural color of the material and free from such an excess of the waterproofing material as would tend to collect and hold dirt or other foreign substances or which by exposure to the weather would undergo chemical changes and in either of such cases result in a discoloration and disfiguration of the surface of the wall or column made of such porous material.

To the accomplishment of the foregoing and such other objects as may hereinafter appear, the invention consists in the method of treatment hereinafter particularly described and then sought to be clearly defined by the claims.

In carrying out the method the surface of brick, stone, or other analogous porous material is first heated, and then the waterproofing substance is applied while the porous material is in a heated condition, so that the heated material will absorb the waterproofing substance. This waterproofing substance may be any suitable waterproofing compound, but ordinarily it consists of melted paraffin, which is applied in a liquid state to the surface of the heated porous material. The excess of this waterproofing material not completely absorbed by the heated material forms a waxy compound on the face of the surface of the waterproof material, which compound is more or less soft or sticky and is apt to continue so to a greater or less extent so long as it remains upon the face of the surface and is subject to varying temperatures of heat and cold from the rays of the sun or otherwise. Owing to this fact, the compound when soft or sticky will receive and retain dirt and dust, and thus discolor and deface the surface, and the dust and dirt thus held by the waxy compound to the surface of the wall will form a compound which will to some extent for a longer or shorter period of time hold moisture and to that extent defeat the object of waterproofing the surface, as well as effect the discoloration and disfiguration of the surface, as before stated. The application of the waterproofing compound also has a tendency to change to some extent the natural color of the brick, stone, or other porous substance of which the wall is formed, which change in color also results to some extent from the means employed for applying the heat preparatory to the application of the waterproofing compound. Heretofore it has been sought to remove the surplus waterproofing compound either by dissolving the compound and washing the surface or by scrubbing the surface or by applying a powdered absorbent substance with the view of absorbing the surplus compound and then removing the powdered substance by brushing or washing. These methods, however, are tedious and expensive and unsatisfactory, because the surplus waterproofing compound is not entirely removed and the clean surface is not always left of a uniform color. With the view of overcoming the objections and difficulties heretofore experienced I remove the surplus waterproofing compound from the surface after the body of the wall has absorbed in its heated state as much of the compound as the material will take up by projecting sand in a finely-divided state against the surface to which the waterproofing compound has been applied, the sand for that purpose being directed by an air-blast against the surface. The sand cuts the waxy waterproofing compound on the surface into finely-divided particles, and the air constituting the blast tends to harden the finely-cut particles of the compound, so that they will not adhere to the surface of the stone, but in this hardened condition will be blown away by the blast. In this way the surplus waterproofing compound is removed from the surface of the stone and the latter is left in its natural color and the whole surface of a uniform color. The finely-divided particles of sand projected by the air-blast also enter the crevices and interstices at the joints and in the face of the stone, so as to completely remove the comparatively soft or sticky surplus portions of the waterproofing compound, and thus leave the whole exposed surface uniform throughout, so that no discoloration can take place by reason of the surplus waterproofing compound not having been removed from any portion of the surface. It is to be observed from the foregoing that not only is the surplus waterproofing compound cut from the surface of the material, but also when it is cut into finely-divided particles the particles are hardened at the time they are detached from the surface of the wall, so that they may be blown away by the air-blast and not given an opportunity to adhere to the surface of the wall. It will thus be seen that the blast is not only employed for the purpose of projecting the sand against the waterproofed surface, so as to cut and detach the surplus waterproof compound from the surface, but also for the purpose of hardening the finely-detached particles of the waxy compound, so that they will not attach themselves again to the surface, but will be blown away by the air-blast. This enables the waterproofing method to be carried out and completed with the very best results and overcomes the difficulties and objections heretofore experienced and some of which have been enumerated, and furthermore the expense is very materially reduced and the method carried out most expeditiously.

Having described my invention and set forth its merits, what I claim is—

1. The within-described method of waterproofing and finishing the surface of stone, brick and other analogous porous material consisting of heating the porous material and while heated applying a waterproof compound to the heated surface and subsequently hardening the surplus of the compound and removing it from the surface by a blast of sand and air, substantially as and for the purposes described.

2. The method of removing the surplus of a waterproof compound from the surface of stone, brick or other analogous porous material consisting in impelling a blast of sand against the waterproof compound to cut the same into fine particles and utilizing a blast of air to harden the finely-divided particles of the waterproof compound and thus prevent them from adhering to the surface under treatment, substantially as described.

In testimony whereof I affix my signature in presence of two witnesses.

NEAL FARNHAM.

Witnesses:
WM. G. HENDERSON,
GEO. W. REA.